United States Patent [19]

Bintliff et al.

[11] 3,859,402

[45] Jan. 7, 1975

[54] PROCESS FOR MAKING THIN, MICROPOROUS FLUOROCARBON POLYMER SHEET MATERIAL

[75] Inventors: Lee I. Bintliff, Levittown, Pa.; Jack C. Sklarchuk, Trenton, N.J.

[73] Assignee: ESB Incorporated, Philadelphia, Pa.

[22] Filed: Nov. 19, 1973

[21] Appl. No.: 416,926

[52] U.S. Cl. ................................................ 264/49
[51] Int. Cl. ........................................... B29d 27/03
[58] Field of Search ....................................... 264/49

[56] References Cited
UNITED STATES PATENTS 3,281,511  10/1966  Goldsmith............................ 264/49
3,518,332  6/1970  Sklarchuk et al..................... 264/49

*Primary Examiner*—M. J. Welsh

[57] ABSTRACT

A process for making thin, microporous fluorcarbon polymer sheet material by mixing fluorocarbon polymer particles and metallic salt particles; forming the resultant mixture into a sheet material; and removing the metallic salt particles from the sheet material.

12 Claims, No Drawings

PROCESS FOR MAKING THIN, MICROPOROUS FLUOROCARBON POLYMER SHEET MATERIAL

BACKGROUND OF THE INVENTION

1. Field of the Invention.

This invention relates to a process for making thin, microporous fluorocarbon polymer sheet material by forming the mixture of fluorocarbon polymer particles and metallic salt particles into a sheet material and from which the metallic salt particles are subsequently removed.

The product which results from the process of this invention is a tough sheet of porous film which may be effectively used as a material for battery separators, filters, and the like and which would be particularly effective for use in preparing electrodes capable of "breathing" oxygen from the air.

2. Description of the Prior Art.

The present state of fuel cell development requires the use of very expensive catalyst materials for both oxygen and fuel electrodes and also requires complicated auxiliary equipment for efficient operation. In order to avoid these disadvantages of fuel cell power systems, alternative power sources were investigated, including air-metal cells. It was decided that an air-metal cell having an air or oxygen electrode capable of breathing oxygen from the air would be a substantial improvement for it would eliminate the need of oxygen tanks and other auxiliary equipment.

During the development of a breathing air electrode, it was determined that a thin, hydrophobic sheet material having uniform porosity would be required to make such as electrode. Commercially available polytetrafluoroethylene sheet material was tried, but it was expensive and did not have uniform porosity. The process was subsequently discovered and patented, see U.S. Pat. No. 3,518,332, for the production of microporous fluorocarbon polymer sheet material but this was a batch process and required the use of skilled labor and expensive solvents for the removal of wax which was included in the pre-sheet mixture.

A novel process has now been discovered whereby microporous fluorocarbon polymer sheet material of uniform porosity can be rapidly and economically produced.

SUMMARY OF THE INVENTION

A process for making microporous fluorocarbon polymer sheet material which process comprises mixing metallic salt particles with fluorocarbon polymer particles and forming the resultant mixture into a sheet material. The metallic salt particles are removed from the sheet material.

DESCRIPTION OF THE INVENTION

As stated previously, this invention relates to a process for preparing thin, microporous fluorocarbon polymer sheet material having a uniform microporosity which is useful in preparing electrodes capable of breathing oxygen from air. The microporous sheet material required for the breathing air electrode must be hydrophobic to prevent absorption of the aqueous electrolyte and subsequent leakage and must have a uniform microporosity to readily permit the access of oxygen from the air to the active sites of the electrode. In order to provide the hydrophobic property, fluorocarbon polymers such as polytetrafluoroethylene, polytrifluoroethylene, polyvinyl fluoride, polyvinylidene fluoride, polytrifluorochloroethylene and copolymers thereof, may be used to prepare the microporous sheet material.

In accordance with this invention, fluorocarbon polymer particles are mixed with a particulate metallic salt pore-former to form a composition capable of being rendered microporous by treatment with a suitable solvent for the pore former. Examples of metallic salts which have been used successfully as pore formers are calcium formate, sodium chloride and sodium carbonate but other water soluble metallic salts would be equally effective. As previously indicated, the pore formers should be inexpensive and must be able to withstand the high temperatures required to fabricate the fluorocarbon polymer, and for this reason metallic salts are preferred. In addition, many metallic salts are highly soluble in water and so they are easily removed without adversely affecting fluorocarbon polymer.

It is essential that the microporosity of the fluorocarbon polymer sheet material be carefully controlled in order to provide a material which will not "leak" electrolyte after it is applied to the air electrode. It has been found that the pore former particles should be classified before being mixed with the fluorocarbon polymer and that only those particles which pass through a 200 mesh screen, having a particle size of about 73 microns or less, should be used. It is particularly preferred that only those pore forming particles passing through a 325 mesh sreen, having a particle size of about 40 microns or less, used. In addition, since the pore former is a fine powder and its uniform particle size is essential, the pore former should be used immediately after classification to prevent agglomeration of the particles.

The proportions of the ingredients in the mixture may vary, though generally the pore former is present in from about 0.25 to about 5 parts by weight per part of fluorocarbon polymer. A ratio of two parts pore-former to one part fluorocarbon polymer has yielded very satisfactory results.

The fluorocarbon polymer and pore former may be mixed by any convenient means, i.e. in a P-K blender or in a Sigma mixer. After the polymer and pore former are thoroughly mixed the mixture is then formed into sheets. A rubber mill having heated rollers is one acceptable means which may be used to form the mixture to sheets. If such a mill is used the mix can be added continually. A very narrow gap may be set on the hot rubber mill thus making it possible to obtain sheets of 10 mil or less in thickness. Sheets having a thickness ranging from about 1 to about 25 mils have been successfully prepared in accordance with the process of this invention. Continuous sheet forming is thus possible by this process.

Following the forming of the sheets, the metallic salt pore former is removed by treating the sheet with a solvent for the pore former. It is preferred that the pore former be watersoluble, in which case, it can be removed simply by immersing the sheet in warm water. Depending on the solubility of the pore former and the thickness of the sheet, the removal of the pore former may require immersion in the leaching solvent for from about ½ to about 24 hours. It is preferred to use fresh leaching solvent periodically to insure substantially complete removal of the pore former. If the sheet material is to be used in conjunction with air breathing electrodes, the sheet material is preferably attached to the air electrode composite before removal of the metallic pore former.

If the use to which the microporous sheet is to be subjected is such that increased strength and resistance to tearing is desired, additional steps may be taken after the sheet material is formed in the heated rubber mill. For example, the sheet material as it passes from the rubber mill in sheet form may be cut in sections across its width and sections cut therefrom may be stacked on the preceding sheet at an angle approximating 90°. The stack may then be calendared to the desired thickness and the calendered sheet stack may then be subjected to the pore former removal steps described previously herein. The number of sheet sections which will be employed in the calendered stack will, of course, vary according to the end use and desired strength of the particular product being made, however, stacks having two or three sheet sections therein generally provides sufficient toughness and durability to satisfy most requirements. Another alternative means of impart added strength to the sheets would be to sinter the sheets after they are removed from the mill but prior to the removal of the pore-forming particles. The sheets may be placed in a cold sintering furnace (a hot furnace might cause warping of the sheet material) and slowly heated to the sintering temperature of the fluorocarbon polymer (about 650°F. for polytetrafluoroethylene). The sheet material may be held at the sintering temperature for the time required, generally from about ½ to 1 hour.

The process of this invention provides an economical and rapid means for the fabrication of microporous fluorocarbon polymer sheet materials and yet avoid the undesirable limitations which necessarily attend a batch process and also avoids the necessity for the use of skilled labor and expensive solvents for the removal of a wax additive which might well render the resultant product unattractively expensive for use in commercial zinc-air cells such as "throw-away" batteries. Additionally, that aspect of the invention which provides for the stacking of individual sheet sections at a 90° angle one to the other permits the production of a microporous fluorocarbon polymer sheet material of such toughness and flexible strength as to be quite reliable for those normal uses to which such sheet may be put.

The thin, microporous fluorocarbon polymer sheet material prepared in accordance with this invention is particularly useful as a backing material for air electrodes in a metal-air battery. This material has uniform microporosity and it is hydrophobic, which makes it possible to prepare air electrodes capable of breathing air and which are substantially leakproof. Other possible uses for this material include those applications which require microporous materials such as battery separators, filters and the like.

EXAMPLE

The following example is intended to be merely illustrative of the invention and not in limitation thereof. Unless otherwise indicated, all quantities are by weight.

$Na_2CO_3$ (micronized) and "Teflon"7 were blended at a ratio of 2:1 for 1/2 hour in a P-K blender (1500 gms total) and then mixed for 15 minutes in a Sigma mixer. This operation begins to make the "Teflon" particles fibrous.

The mix was then continually added to a rubber mill heated to a temperature of 250°F with not more than 0.010 inch spacing. The front roll speed was 22 rpm and back roll speed was 20 rpm. The sheet emerging from the mill was 5 inches in width and was cut as it emerged into 5 inch lengths. The 5 × 5 inch sheets were then arranged in stacks 3 sheets high with the middle sheet being stacked at an angle approximating 90° to the two outer sheets.

The rubber mill spacing was adjusted to 0.028 inches and the 3 sheet high stacks were passed through. It is preferable that the grain of the outer sheets be parallel to the roll width. The roll mill spacing may then be closed, e.g. another 3–4 mills, and the sheets passed through again to obtain the desired thickness. If thinner stacks are desired, this step may be repeated.

The resultant 0.020 inch sheet is tough and uniform and inexpensive to produce.

The foregoing detailed description has been given for clarity of understanding only and no unnecessary limitations are to be understood therefrom. The invention is not limited to the exact details shown and described for obvious modifications will occur to one skilled in the art.

The embodiments of the invention in which an exclusive property or privilege is claimed are defined as follows:

1. A process for making microporous fluorocarbon polymer sheet material which process comprises mixing fluorocarbon polymer particles with particles of a metallic salt pore-former; forming the resultant mixture into a sheet material; and removing said metallic salt pore former, wherein the fluorocarbon polymer particles are selected from the group consisting of polytetrafluoroethylene, polytrifluoroethylene, polyvinylfluoride, polyvinylidenefluoride, polytrifluorochloroethylene and copolymers thereof.

2. A process according to claim 1 wherein the amount of pore-former present is from about 0.25 to about 5 parts by weight of pore-former per part of fluorocarbon polymer.

3. A process according to claim 1 wherein the sheet material has thickness of from about 1 to about 25 mils.

4. A process according to claim 1 wherein the metallic salt pore-former is selected from the group consisting of calcium formate, sodium chloride and sodium carbonate.

5. A process according to claim 1 comprising additionally the steps of cutting the sheet material into sections and stacking at least two such sections one upon another each of such sections being stacked at an angle approximately 90° to the preceding sheet in the stack, before the metallic salt pore former is removed therefrom.

6. A process according to claim 5 wherein the amount of pore-former present is from about 0.25 to about 5 parts by weight of pore-former per part of fluorocarbon polymer.

7. A process according to claim 5 wherein the sheet material has a thickness of from about 1 to about 25 mils.

8. A process according to claim 5 wherein the metallic salt pore-former is selected from the group consisting of calcium formate, sodium chloride and sodium carbonate.

9. A process according to claim 1 comprising additionally the step of heating the sheet material to a temperature sufficient to siter the fluorocarbon polymer particles, before the metallic salt pore-former is removed therefrom.

10. A process according to claim 9 wherein the amount of pore-former present is from about 0.25 to about 5 parts by weight of pore-former per part of fluorocarbon polymer.

11. A process according to claim 9 wherein the sheet material has a thickness of from about 1 to about 25 mils.

12. A process according to claim 9 wherein the metallic salt pore-former is selected from the group consisting of calcium formate, sodium chloride and sodium carbonate.

* * * * *